W. MARVIN.
CHURN.
No. 182,943.
Patented Oct. 3, 1876.
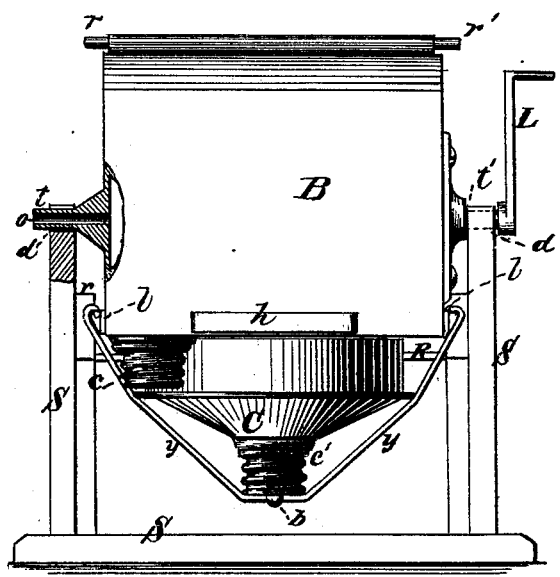
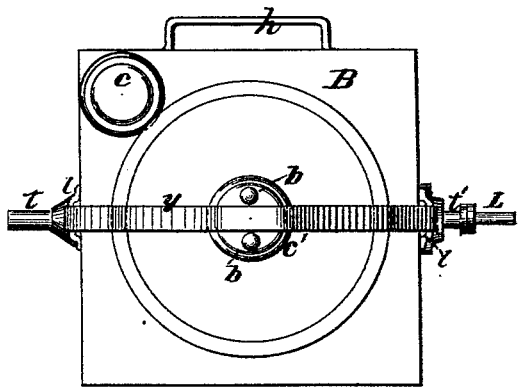
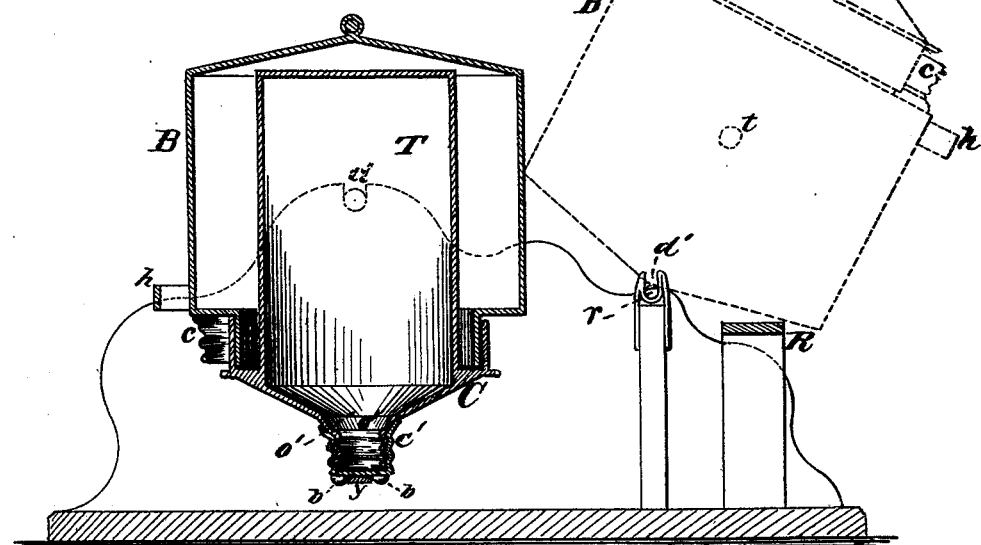
Witnesses
John Becker
Fred. Haynes
William Marvin
by his Attorneys
Brown & Allen

UNITED STATES PATENT OFFICE.

WILLIAM MARVIN, OF SUMNER, MICHIGAN, ASSIGNOR OF ONE-HALF HIS RIGHT TO SAMUEL H. STEVENS, OF SAME PLACE.

IMPROVEMENT IN CHURNS.

Specification forming part of Letters Patent No. 182,943, dated October 3, 1876; application filed July 15, 1876.

*To all whom it may concern:*

Be it known that I, WILLIAM MARVIN, of Sumner, in the county of Gratiot and State of Michigan, have invented an Improvement in Churns; and I do hereby declare that the following is a full, clear, and exact description of the same, reference being had to the accompanying drawing, which forms part of this specification.

My invention consists in the peculiar construction of a churn designed for the production of the maximum quantity of butter from milk or from cream of any density, and such effective regulation of the temperature and mechanical agitation of the milk or cream as to produce the butter with less labor than is required in the use of other churns.

Figure 1 in the accompanying drawings is a side elevation of a churn embracing my improvements, a small portion being broken away to show the interior of the cream or milk chamber, and a hollow trunnion being shown in section. Fig. 2 is a top view. Fig. 3 is a sectional view of the churn and the supporting-frame of the same, and a dotted outline diagram, showing one of the positions of the said body on the said supporting-frame.

B is the body of the churn, into which there are three openings, to wit., an opening provided with a screw-cap, $c'$, a much larger opening provided with a cover, C, and an opening, $o$, Fig. 1, through the trunnion $t$. The opening $o$ through the trunnion $t$ is designed for the admission of air into or escape of air from the body B during the process of churning, and it may be stopped with a plug or left open, as occasion may require. In some cases, as when the churn is oscillated, as hereinafter described, it may be provided with a funnel having a bent neck, which will allow the passage of air, while preventing the loss of cream or milk. To the trunnion $t'$ is attached a removable crank, L. To the body B is also attached the handle $h$, the use of which is hereinafter described. The body B is preferably made rectangular in horizontal cross-section, and, with the side opposite the cover C, bent into angular form, as shown in Figs. 1 and 3, but it may be circular or of other form, in horizontal cross-section, if desired. Moreover, to the body B are attached the rock-bearings $r\ r'$, Figs. 1 and 3, the use of which will be hereinafter described.

To the cover C is firmly attached a tempering-chamber and dasher, T, Fig. 3, the said cover C forming one of the walls of the said tempering-chamber, and having an opening, $o'$, Fig. 3, by which access is had to the interior of said chamber T, the opening $o'$ being also provided with a screw-cap, $c'$. The cover C and the screw-caps $c\ c'$ are fitted tightly enough to prevent the escape of liquids when the churn is in use. The screw-cap $c'$ is, moreover, provided with teats, knobs, or bosses $b$, which press against the sides of the yoke $y$, which passes over the said screw-cap between the teats $b$ when the tempering-chamber T is closed, and engages with the lugs $l$ attached to the body B of the churn. The yoke $y$ thus firmly holds the cover C and the attached tempering-chamber and dasher T in place, and, acting against the teats $b$, prevents the screw-cap $c'$ from unscrewing.

The supporting-frame S of the churn is preferably, but not essentially, made in the form shown in Figs. 1 and 3. It has two bearings, $d\ d$, for the trunnions $t\ t'$, and also two bearings, $d'$, Fig. 3, for the rock-bearings $r\ r'$ attached to the body of the churn. When the rock-bearings $r\ r'$ are placed in the bearings $d'$, as shown in dotted outline, the churn may rest partly in the bearings $d$ and partly upon the minor support R, which forms part of the supporting-frame S.

The churn is used as follows: The cream or milk is placed in the body B in the space between the tempering-chamber and dasher T and the walls of said body. In the tempering-chamber T is placed water of the proper temperature to either cool or warm the cream or milk to be churned till the same acquires the proper temperature for the most rapid and complete separation of its contained butter. If milk or thin cream is to be churned, the rock-bearings $r\ r'$ are placed in the bearing $d'$ of the supporting-frame, and an oscillating motion is imparted to the whole by means of the handle $h$. If thick cream is to be churned, the trunnions $t$ $t'$ are placed in the bearings $d$ of the frame, and a rotary motion is given to the whole by the use of the crank L. The milk or cream is thus forcibly dashed against the walls of the body B and the outside of the tempering-chamber and dasher T, by which action the vesicles containing the butter are broken, and the churning is rapidly and completely performed. The tempering-chamber thus acts not only to regulate the temperature of the milk or cream, but also performs the function of a dasher.

I claim—

1. The combination of the oscillating or rotating churn-body B with the hollow dasher T, having a tempering-chamber formed within it, substantially as and for the purposes set forth.

2. The combination of the tempering-chamber and dasher T with the cover C and the body B, substantially as and for the purpose set forth.

3. The combination of the cover C, the screw-cap $c'$, having the teats $b$ $b$, the lugs $l$, attached to the body of the churn, and the yoke $y$, securing both the cover and screw-cap, substantially as and for the purpose set forth.

WILLIAM MARVIN.

Witnesses:
SAMUEL BIGELOW,
MILLS MECOMBER.